United States Patent
Elmieh et al.

(10) Patent No.: US 9,766,786 B2
(45) Date of Patent: Sep. 19, 2017

(54) VISUAL STORYTELLING ON A MOBILE MEDIA-CONSUMPTION DEVICE

(71) Applicant: Google Technology Holdings LLC, Mountain View, CA (US)

(72) Inventors: Baback Elmieh, Palo Alto, CA (US); Darren Mark Austin, San Jose, CA (US); Brian M. Collins, South San Francisco, CA (US); Mark Jason Oftedal, Naperville, IL (US); Jan J. Pinkava, Portland, OR (US); Douglas Paul Sweetland, Los Angeles, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 345 days.

(21) Appl. No.: 14/333,387

(22) Filed: Jul. 16, 2014

(65) Prior Publication Data
US 2015/0026576 A1    Jan. 22, 2015

Related U.S. Application Data

(60) Provisional application No. 61/856,445, filed on Jul. 19, 2013.

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 3/0485* (2013.01); *G06F 17/30846* (2013.01);
(Continued)

(58) Field of Classification Search
CPC ............... G06F 3/04842; G06F 3/0485; G06F 17/30846; H04N 21/41407; H04N 21/4333; H04N 21/4728; H04N 21/8541
See application file for complete search history.

(56) References Cited

U.S. PATENT DOCUMENTS 5,607,356 A * 3/1997 Schwartz ................ A63F 13/10
                                                     345/473
5,892,507 A * 4/1999 Moorby ................. G11B 27/34
                                                  707/E17.009

(Continued)

FOREIGN PATENT DOCUMENTS

| EP | 1087618 | 3/2001 |
|---|---|---|
| EP | 2209306 | 7/2010 |
| WO | WO-2006056311 | 6/2006 |

OTHER PUBLICATIONS

"International Search Report and Written Opinion", Application No. PCT/US2015/041339, Oct. 30, 2015, 13 pages.
(Continued)

*Primary Examiner* — Dino Kujundzic
(74) *Attorney, Agent, or Firm* — Colby Nipper PLLC (57) ABSTRACT

Techniques and apparatuses for visual storytelling on a mobile media-consumption device are described. These techniques and apparatuses enable a user to view events central to the story while also viewing context for the story. By so doing, a user may enjoy the story as the story's author intended without sacrificing a user's ability to engage with the story's context.

20 Claims, 11 Drawing Sheets

(51) Int. Cl.
*G06F 3/0485* (2013.01)
*G06F 17/30* (2006.01)
*H04N 21/414* (2011.01)
*H04N 21/433* (2011.01)
*H04N 21/4728* (2011.01)
*H04N 21/8541* (2011.01)

(52) U.S. Cl.
CPC ... *H04N 21/41407* (2013.01); *H04N 21/4333* (2013.01); *H04N 21/4728* (2013.01); *H04N 21/8541* (2013.01)

(56) References Cited

U.S. PATENT DOCUMENTS

| | | | |
|---|---|---|---|
| 6,714,909 B1 * | 3/2004 | Gibbon | G06F 17/30787 704/246 |
| 7,184,574 B1 | 2/2007 | Zahavi | |
| 7,467,218 B2 * | 12/2008 | Gould | H04N 5/76 382/254 |
| 7,860,309 B1 | 12/2010 | Bodnar et al. | |
| 7,904,812 B2 * | 3/2011 | Atlas | G06F 17/2241 715/716 |
| 9,086,724 B2 | 7/2015 | Sakaguchi et al. | |
| 9,087,403 B2 | 7/2015 | Keating et al. | |
| 9,183,560 B2 | 11/2015 | Abelow | |
| 9,589,597 B2 | 3/2017 | Austin et al. | |
| 9,607,424 B2 * | 3/2017 | Ng | G06T 15/005 |
| 2003/0145331 A1 * | 7/2003 | Escobar | H04N 7/17318 725/110 |
| 2003/0232318 A1 | 12/2003 | Altenhofen et al. | |
| 2004/0021668 A1 | 2/2004 | Chevallier et al. | |
| 2005/0025465 A1 | 2/2005 | Danieli | |
| 2006/0256133 A1 | 11/2006 | Rosenberg | |
| 2007/0028270 A1 * | 2/2007 | Ostojic | H04N 5/44543 725/53 |
| 2007/0061862 A1 | 3/2007 | Berger et al. | |
| 2008/0005669 A1 | 1/2008 | Eilertsen et al. | |
| 2008/0215172 A1 | 9/2008 | Digon | |
| 2008/0267451 A1 | 10/2008 | Karazi | |
| 2009/0113278 A1 | 4/2009 | Denoue et al. | |
| 2009/0181736 A1 | 7/2009 | Haigh-Hutchinson et al. | |
| 2009/0198719 A1 | 8/2009 | DeWitt | |
| 2009/0201313 A1 | 8/2009 | Thorn | |
| 2009/0249404 A1 | 10/2009 | Chen | |
| 2009/0325660 A1 | 12/2009 | Langridge | |
| 2010/0153520 A1 | 6/2010 | Daun et al. | |
| 2010/0157064 A1 | 6/2010 | Cheng et al. | |
| 2010/0174421 A1 | 7/2010 | Tsai et al. | |
| 2010/0208138 A1 * | 8/2010 | Mohri | G06F 1/1622 348/570 |
| 2010/0251101 A1 | 9/2010 | Haussecker et al. | |
| 2011/0126106 A1 | 5/2011 | Ben Shaul et al. | |
| 2011/0299832 A1 | 12/2011 | Butcher | |
| 2011/0304627 A1 | 12/2011 | Kegel | |
| 2012/0092348 A1 | 4/2012 | McCutchen | |
| 2012/0105473 A1 | 5/2012 | Bar-Zeev et al. | |
| 2012/0169882 A1 | 7/2012 | Millar et al. | |
| 2012/0249424 A1 | 10/2012 | Bove et al. | |
| 2014/0002580 A1 | 1/2014 | Bear et al. | |
| 2014/0133834 A1 | 5/2014 | Shannon | |
| 2014/0282013 A1 * | 9/2014 | Amijee | G06F 3/0482 715/732 |
| 2015/0012827 A1 | 1/2015 | Elmeih | |
| 2015/0022557 A1 | 1/2015 | Austin et al. | |
| 2015/0023650 A1 | 1/2015 | Austin et al. | |
| 2015/0042795 A1 | 2/2015 | Tsuria et al. | |
| 2016/0054863 A1 | 2/2016 | Elmieh et al. | |

OTHER PUBLICATIONS

"SightLine: The Chair—Virtual Surreality", Retrieved from: http://sightlinevr.com/index.html on Nov. 30, 2015, 2 pages.

"Restriction Requirement", U.S. Appl. No. 14/335,821, Nov. 4, 2015, 5 pages.

"International Preliminary Report on Patentability", Application No. PCT/US2014/046907, Jan. 19, 2016, 8 pages.

"International Preliminary Report on Patentability", Application No. PCT/US2014/047302, Jan. 19, 2016, 8 pages.

"Non-Final Office Action", U.S. Appl. No. 14/209,432, Mar. 10, 2016, 21 pages.

"Non-Final Office Action", U.S. Appl. No. 14/335,821, Feb. 25, 2016, 9 pages.

"International Search Report and Written Opinion", Application No. PCT/US2014/046907, Nov. 6, 2014, 11 Pages.

"International Search Report and Written Opinion", Application No. PCT/US2014/047302, Jan. 22, 2015, 13 Pages.

"International Search Report and Written Opinion", Application No. PCT/US2014/047269, Nov. 10, 2014, 13 pages.

Heymann, et al., "Representation, Coding and Interactive Rendering of High-Resolution Panoramic Images and Video Using MPEG-4", Panoramic Photogrammetry Workshop, Berlin, Germany, Feb. 28, 2005, 5 Pages.

"360 degree Interactive Storytelling", University of Glasgow Retrieved from the Internet: URL:http://www.kwiatek.krakow.pl/publications/28128927_360storytelling_University_of_Glasgow_Karol_Kwiatek_PDF.pdf, Sep. 27, 2012, 80 Pages.

"Final Office Action", U.S. Appl. No. 14/209,432, Jul. 7, 2016, 18 pages.

"Non-Final Office Action", U.S. Appl. No. 14/513,761, Oct. 4, 2016, 12 pages.

"Notice of Allowance", U.S. Appl. No. 14/335,821, Oct. 25, 2016, 5 pages.

"Corrected Notice of Allowance", U.S. Appl. No. 14/335,821, Jan. 12, 2017, 2 pages.

"First Action Interview Office Action", U.S. Appl. No. 14/335,833, Mar. 6, 2017, 3 pages.

"First Action Interview Office Action", U.S. Appl. No. 14/526,311, Mar. 9, 2017, 3 pages.

"International Preliminary Report on Patentability", Application No. PCT/US2015/041339, Feb. 2, 2017, 10 pages.

"Pre-Interview Communication", U.S. Appl. No. 14/335,833, Dec. 29, 2016, 3 pages.

"Pre-Interview Communication", U.S. Appl. No. 14/526,311, Feb. 10, 2017, 7 pages.

"Final Office Action", U.S. Appl. No. 14/513,761, dated May 3, 2017, 13 pages.

"Foreign Office Action", EP Application No. 14752459.9, dated Mar. 6, 2017, 8 pages.

"Notice of Allowance", U.S. Appl. No. 14/335,833, dated May 24, 2017, 8 pages.

* cited by examiner

| Context Timing 814 | Event Timing 812 | Table 802 | Events 804 | Story Views 816 | Context Views 818 |
|---|---|---|---|---|---|
| | 0 - 0:38 | | 1 | X | |
| | 0:39 - 1:14 | | 2 | X | |
| | 1:15 - 1:48 | | 3 | X | |
| 8 Seconds of Context Viewed | | | | | X |
| | | | | | X |
| | 1:48 - 2:12 | | 3 | X | |
| | 2:13 - 6:41 | | 4 | X | |
| | 6:42 - 6:45 | | 5 | X | |
| | 6:56 - 10:14 | | 6 | X | |
| | 10:15 - 11:02 | | 7 | X | |
| | 11:03 - 11:07 | | 8 | X | |
| 7 Minutes of Context Viewed | | | | | X |
| | | | | | X |
| | | | | | X |
| | 11:03 - 12:15 | | 8 | X | |
| | 12:16 - 13:13 | | 9 | X | |
| | 13:14 - 16:14 | | 10 | X | |
| | 16:15 - 17:00 | | 11 | X | |
| 1:34 of Context Viewed | 17:01 - 17:40 | | 12 | X | |
| | | | | | X |
| | 17:33 - 18:14 | | 12 | X | |
| | 18:15 - 20:00 | | 13 | | |

Total Story Time = 20:00 + 0:04 + 0:07 = 20:11 ◄——— 808
Total Context Time = 0:08 + 7:00 + 1:34 = 8:42 ◄——— 810
Total Time Spent = 28:53 ◄——— 806

VISUAL STORYTELLING ON A MOBILE MEDIA-CONSUMPTION DEVICE

PRIORITY APPLICATION

This application claims priority under 35 U.S.C. §119(e) to U.S. Provisional Patent Application No. 61/856,445, entitled "Visual Storytelling on a Mobile Media-Consumption Device" and filed on Jul. 19, 2013, the disclosure of which is incorporated in its entirety by reference herein.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Current storytelling comes in many forms, including novels, short stories, audio books, movies, television programs, and live theater. Some less-visual forms of storytelling tell stories well using mobile devices, such as through text for novels and audio for audio books. Visual storytelling, however, suffers from the size of a mobile device's display. These smaller displays often make the presentation of sufficient detail or sufficient context mutually exclusive. While sufficient detail can be provided by zooming in to see a character's expression on a small screen, the surrounding context of what is around or near that character is lost. Alternately, while sufficient context is provided by showing most of a scene, much of the detail needed to effectively tell the story is lost when showing a large scene on a small screen.

BRIEF DESCRIPTION OF THE DRAWINGS

Techniques and apparatuses for visual storytelling on a mobile device are described with reference to the following drawings. The same numbers are used throughout the drawings to reference like features and components.

DETAILED DESCRIPTION

Overview

This document describes techniques and apparatuses of visual storytelling on a mobile media-consumption device. These techniques and apparatuses enable a user to view events central to the story while also viewing context for the story. By so doing, a user may enjoy the story as the story's author intended without sacrificing a user's ability to engage with the story's context.

Assume, for example, that a user wishes to watch the movie Ratatouille about a rat that becomes a chef in Paris, France. Conventional techniques shrink down the movie, which was intended for a large movie screen, to fit the movie into the user's mobile-device display. Movie screens in theaters vary in size, many averaging about 30 feet by 70 feet, or about 2,100 square feet in viewing area. Larger smartphone displays measure four to five inches diagonally, or about 0.07 square feet. Even taking into account that users are much closer to a mobile-device display that a movie screen, it is readily apparent that substantial detail is lost when using these conventional techniques.

The techniques described in this document, however, enable a user to enjoy the story in sufficient detail as well as the story's context. For this same movie, the techniques present the movie as a visual experience through which a user's mobile-device display is a view into that visual experience. The user may select to watch, in sufficient visual detail, the events central to the story, and deviate from those events to view the surrounding context.

Assume that the rat in the movie, named Remy, is floating rapidly down a sewer pipe. The user can view Remy by orienting his or her display to see Remy in detail. The user can also, however, tilt the display up to see the ceiling of the sewer pipe, left to view the pipe that Remy has already floated down, right to view the pipe Remy is heading toward, and so forth. Further, when the user deviates from the events central to the story—here Remy traveling down the pipe—to look at trash in the sewer water or grime on the pipe's ceiling, the techniques pause or delay the events central to the story so that the story still can be fully told to the user. The user may look away, focus on the trash and so forth, and when the user moves the display to see Remy once again, the story continues. By so doing, a user can enjoy the story as the author intended and with context, all through a mobile-device screen.

This is but one example of the many ways in which the techniques enable visual storytelling on a mobile device. The following discussion turns to an operating environment, techniques that may be employed in the operating environment, and a device in which component(s) of the operating environment can be embodied. In the discussion below, reference is made to the operating environment by way of example only.

Example Environment

Figure 1:
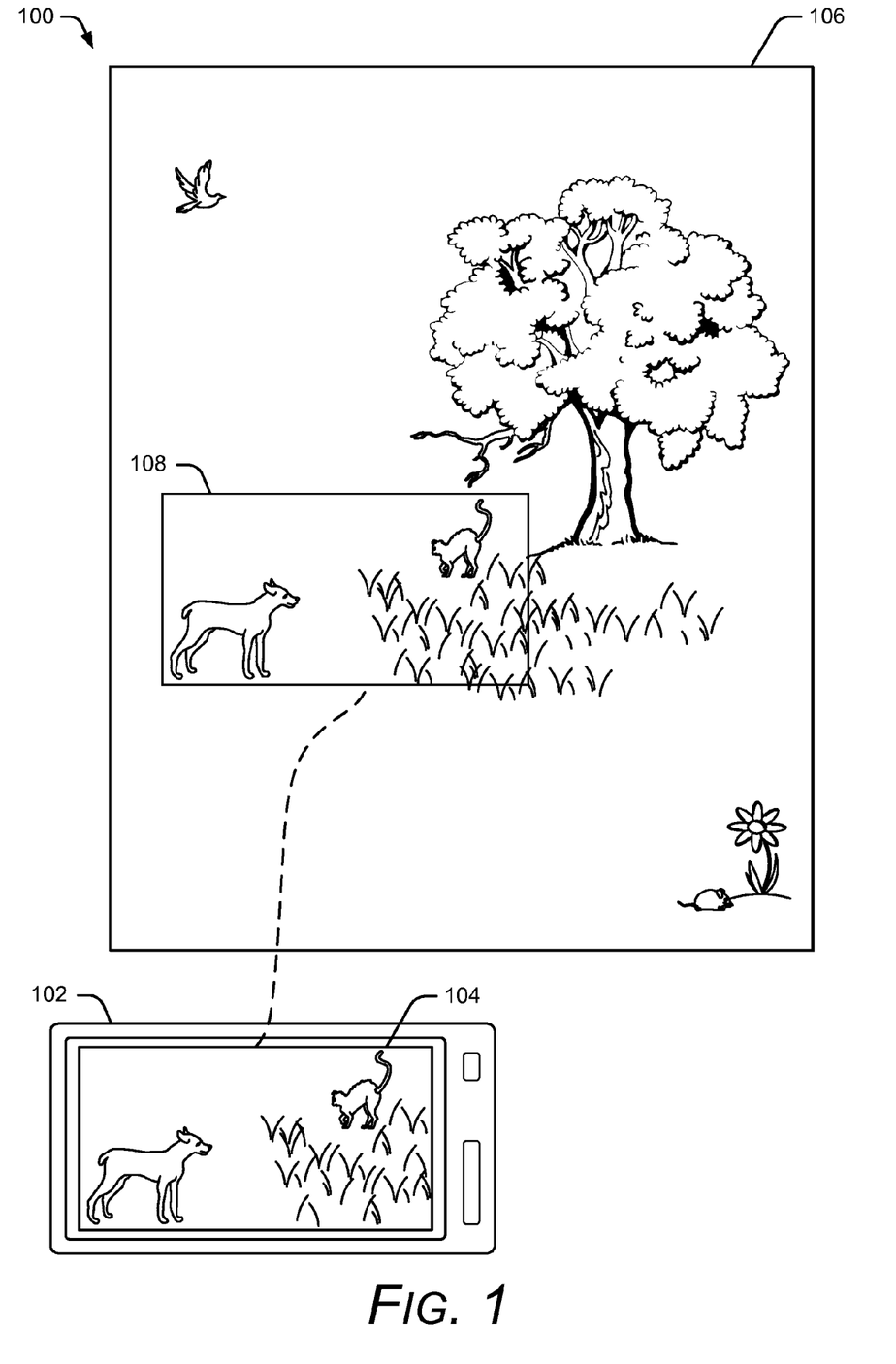
FIG. 1 illustrates an example environment in which techniques for visual storytelling on a mobile media-consumption device can be implemented.

FIG. 1 illustrates an example environment 100 that is operable to employ techniques described herein. Environment 100 includes a mobile media-consumption device 102 (mobile device 102) having a display 104 on which portions of visual experience 106 are presented.

Visual experience 106 is capable of telling a story and providing context for that story, though some context within visual experience 106 can be unrelated to the story. Each story is an authored series of events previously written by a storyteller (e.g., a human writer) and presentable in a moving visual form, such as a theatrical production of Leo Tolstoy's novel War and Peace, Orson Welles's film Citizen Kane, and the computer-animated movie Toy Story by John Lasseter, Pete Docter, Andrew Stanton, and Joe Ranft.

Which portions of visual experience 106 are presented on display 104 depend on view selections made by a user of mobile device 102. Thus, mobile device 102 is capable of receiving view selections and, in response to these view selections, presenting views of visual experience 106 on display 104. View 108 is one example view showing a portion of visual experience 106, here a dog staring at a cat, which is central to the story being told.

Because view 108 shows characters central to the story, the techniques progress through the authored series of events making up the story. When the view selected is contextual, mobile device 102 ceases to tell the story. Thus, when a user selects to view various contextual elements, such as a bird, a flower, or a mouse, the story ceases to progress. When the user again selects to view the dog and cat, the techniques continue the story. By so doing, a story can be told in sufficient detail while still permitting a user to view context for that story.

Figure 2:
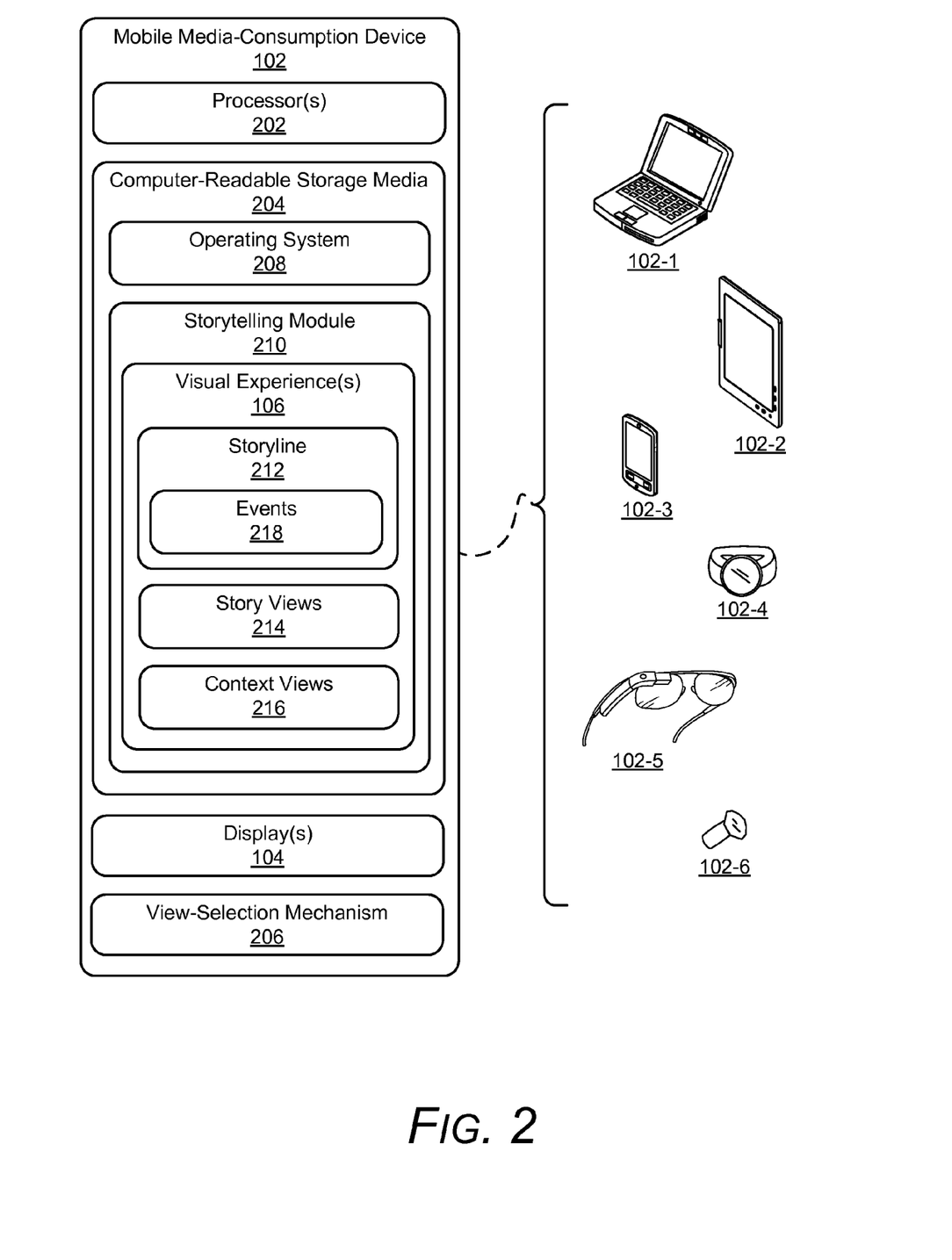
FIG. 2 illustrates an example embodiment of the mobile media-consumption device of FIG. 1.

More specifically, consider FIG. 2, which illustrates an example embodiment of mobile media-consumption device 102 of FIG. 1. Mobile device 102 is illustrated with six example devices: a laptop computer 102-1, a tablet computer 102-2, a smart phone 102-3, a media-consumption watch 102-4, media-consumption eyewear 102-5, and a media-consumption ring 102-6, though other media-consumption devices and systems, such as a personal media player, a digital camera, and a personal navigation device are contemplated.

Mobile device 102 includes or has access to computer processor(s) 202, computer-readable storage media 204 (media 204), one or more displays 104, and view-selection mechanism 206. Media 204 includes an operating system 208 and storytelling module 210. Although not shown, media 204 may also include applications and user data, such as digital images, audio files, or documents.

View-selection mechanism 206 is capable of sensing a user's view selections through various input manners and devices, which range from buttons, capacitive sensors, and touch screens to orientation sensors and cameras capable of determining an orientation or orientation change of mobile device 102. Buttons and capacitive sensors enable a user to select views through, for example, four buttons or sensors, one each to select to move the view right, left, up, or down. Touch screens or pads enable a user to select views with visual controls similar to the buttons but also through zooming gestures, such as a pinch gesture to zoom out or a spread gesture to zoom in. Cameras and orientation sensors can determine selections that tilt, turn, move in, move out, move up, move left, move right, and move down display 104, to name just a few. Orientations sensors, in some cases, include micromachined accelerometers. These micromachined accelerometers, depending on the types, are configured to measure in multiple axes magnitude and direction of proper acceleration (e.g., G-force) as a vector quantity. By so doing, the micromachined accelerometers can sense orientation, coordinate acceleration, vibration, shock, and falling. For use as orientation sensors, these micromachined accelerometers can sense six degrees of freedom of mobile device 102, including three degrees of freedom in translation (X, Y, and Z) and three in rotation (pitch, yaw, and roll). Cameras can be used to track a device's location, such as relative to a user viewing the display, by tracking imaged objects (e.g., a book pictured by the camera can be used to determine, based on the book changing size or location in an image captured by the camera, an orientation or location in three dimensions of the display) or objects that relate to the viewer, such as by tracking a user's facial features (e.g., eyes, cornea, irises).

Furthermore, view selections received through these various input manners can be mapped to a particular desired view. For example, if a user moves a display away from herself, this movement can be sensed by an accelerometer or camera of view-selection mechanism 206, and sensor data from the accelerometer or camera passed directly to storytelling module 210 or processed by view-selection mechanism 206 to analyze the sensor data to determine that the display is being moved away from the user. This determination can map to desired views, such as a zooming in or out of the currently viewed content. Other examples include selecting a right button or touch control, which is then sensed by (or passed as selection data to) view-selection mechanism 206, which in turn determines that display 104 has moved right relative to content being displayed. This determination can be passed to storytelling module 210, which then presents a different view (to the right of the prior view) of visual experience 106.

Note that these various input manners can be received and responded to in real time—a user's selection to zoom in by pulling a display in, look up by moving a display up or tilting up, or look down by tilting down, can result in the view changing as fast or nearly as fast as the user makes the selection. The techniques enable a user to view a story, movie, or other content as fast or almost as fast as the user would view his or her own world. Furthermore, these various inputs can be combined. Assume for example that a user is viewing both a man and woman sitting at an outdoor café. Assume that the user wants to see the brand of soft drink being consumed by the woman. The user may simply move the display from being centered between the couple to at the soft drink, and then at the same time or after, move the display toward the user. By so doing, view-selection mechanism 206 senses the orientation change, passes the determined orientation to storytelling module 210, which then zooms in and centers on the soft drink, thereby showing it in detail.

This mapping of view selections to portions of visual experience 106 can be conceptualized as a direct mapping from a view selection to a two or three dimensional space representing visual experience 106. Thus, for a two-dimensional movie, view selections can be mapped to point, square, or rectangle on a planar surface as a representation of the two-dimensional movie. For a three-dimensional space, such as some computer-generated shorts, television shows, or movies, or some live-action movies that are filmed with additional cameras, a view selection can be mapped to a non-planar surface representing possible views of visual experience 106. This can be conceptualized as a sphere, for example, with each new frame of the experience mapped to an interior of the sphere with a user viewing from within the interior. Thus, a view selection tilting a display down can view grass on the ground, a view selection tilting a display up can view clouds in the sky, and a view selection moving left or right can view content to the left or right.

Returning to FIG. 2, storytelling module 210 includes or has access to one or more visual experiences 106, which may include a storyline 212, story views 214, and context views 216. Storytelling module 210 is capable of presenting visual experience 106, receiving view selections, and progressing or ceasing to progress a story based on whether or not the view selections show the story, in whole or part.

Storyline 212 includes an authored series of events 218 (events 218) that, when presented in the authored series, tell a story. Events 218 can be authored by one or many human authors, alone or with computer assistance. Further, events 218 can be of a fixed order and/or number, though each may vary in an amount of time to present each event. A fast-moving music video, for example, may present new scenes and actions in less than one second. A three-hour drama, however, may have few scene changes and long stretches of dialog, which can therefore include events that may be many minutes long. Events can be part of respective sets of events making up scenes or acts, which an author may arrange such that the techniques, when returning to an incomplete event, repeat sets of events, though this is not required.

Figure 3:
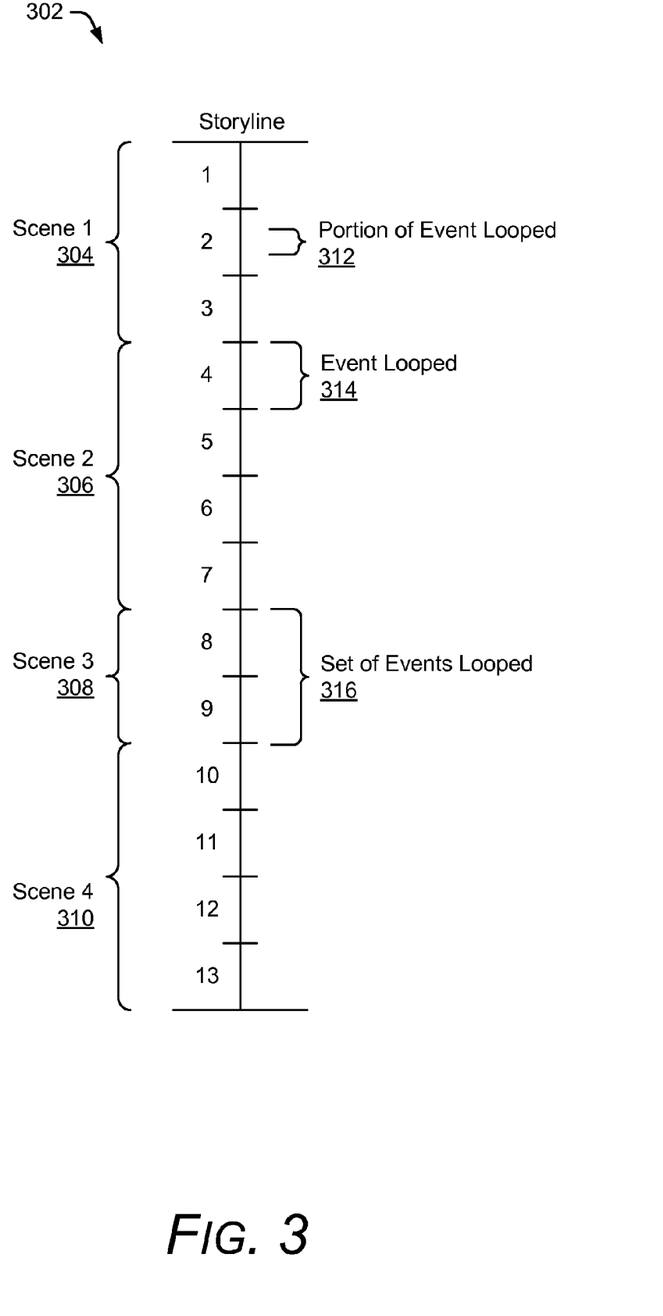
FIG. 3 illustrates a storyline for an animated short story in which a dog chases a cat around a park.

By way of example, consider FIG. 3, which illustrates a storyline 302 for an animated short story in which a dog chases a cat around a park. The short story has four scenes and 13 total events, first scene 304 includes events 1-3, second scene 306 includes events 4-7, third scene 308 includes events 8 and 9, and fourth scene 310 includes events 10-13. Assume that event 1 includes the dog sleeping restfully in the field and the cat slowly creeping through the grass near the dog. FIG. 1 illustrates the next event, event 2, in which the dog wakes up and stares at the cat and during which the cat arches her back and stares back at the dog. In event 3 the dog chases the cat and the cat runs up a tree. This example storyline 302 will be used as an aid in describing story views 214 and context views 216 below.

Story views 214 present at least a portion of one of events 218, which can be previously determined to enable a key element of the event to be seen or a substantial portion of the event to be seen. This previous determination is not required, as storytelling module 210, in some cases, can determine which views present events 218 of storyline 212. Whether predetermined or not, various manners can be used to determine whether a view is a story view or a context view.

Figure 4:
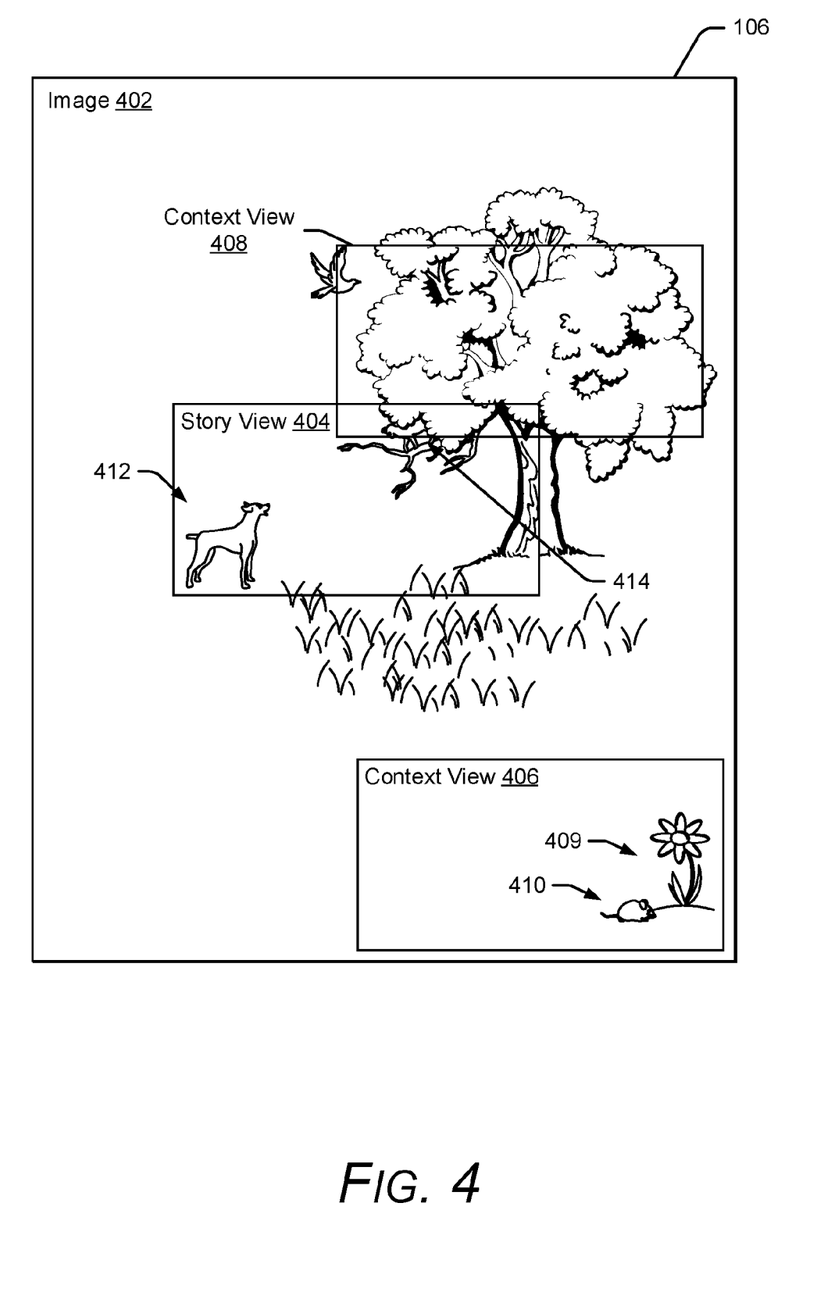
FIG. 4 illustrates an image of a visual experience for the storyline shown in FIG. 3.

By way of example, consider FIG. 4, which illustrates an image 402 of visual experience 106 for storyline 302 of FIG. 3. Image 402 includes a portion of event 4 of storyline 302 and includes a story view 404 and context views 406 and 408, which are examples of story views 214 and context views 216 of FIG. 2, respectively. Event 4 includes the dog barking at the cat with the cat up the tree. Thus, story view 404 includes the main characters of the story and is central to event 4. Context views 406 and 408 include no portion or an insufficient portion of event 4. This is illustrated with context view 406 showing flower 409 and mouse 410, which includes no portion of event 4 by not showing any of dog 412 or cat 414. Context view 408 shows an insufficient portion of event 4 by showing part of cat 414 but none of dog 412.

Figure 5:
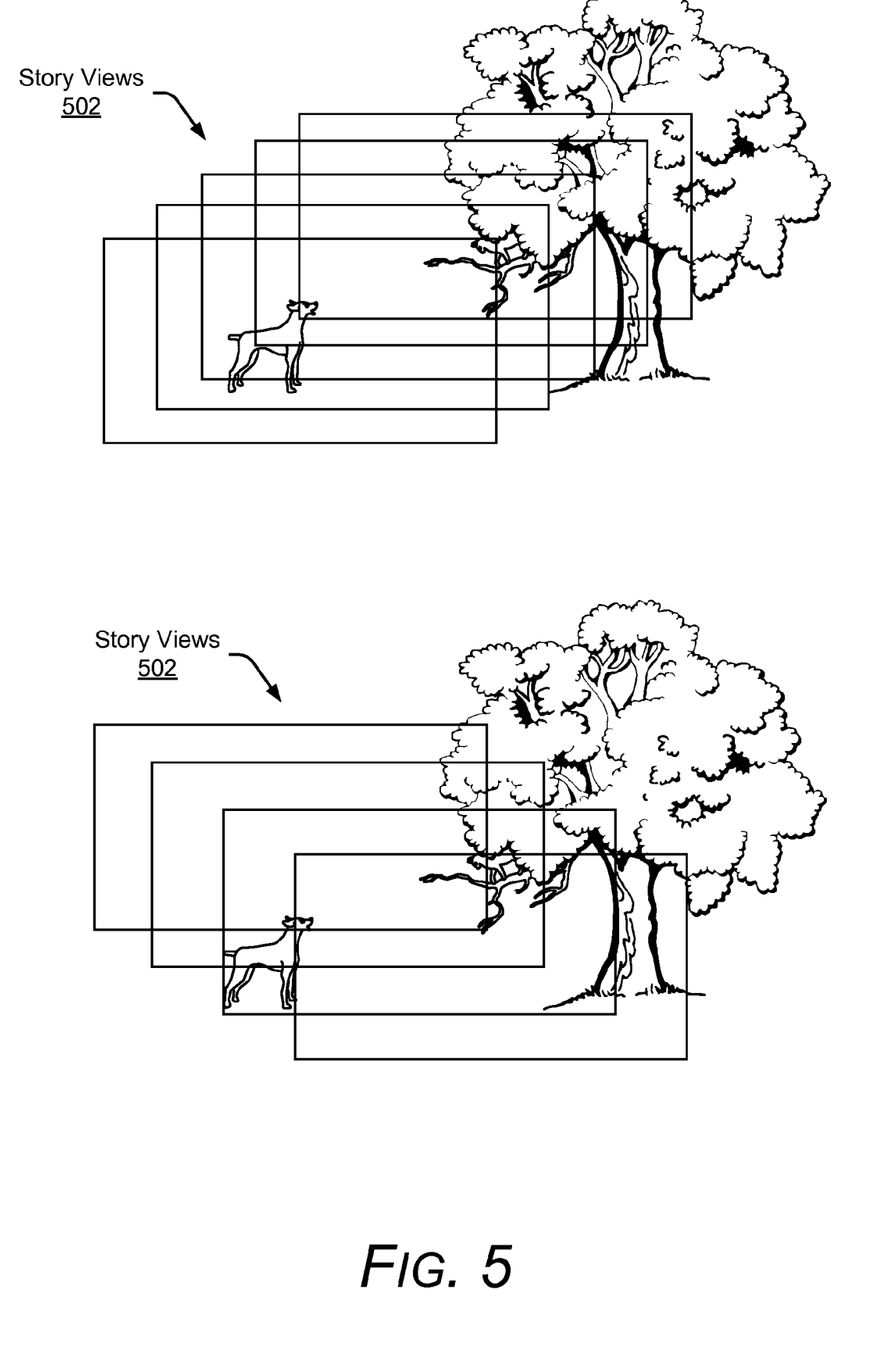
FIG. 5 illustrates possible story views for the image of FIG. 4.
Figure 6:
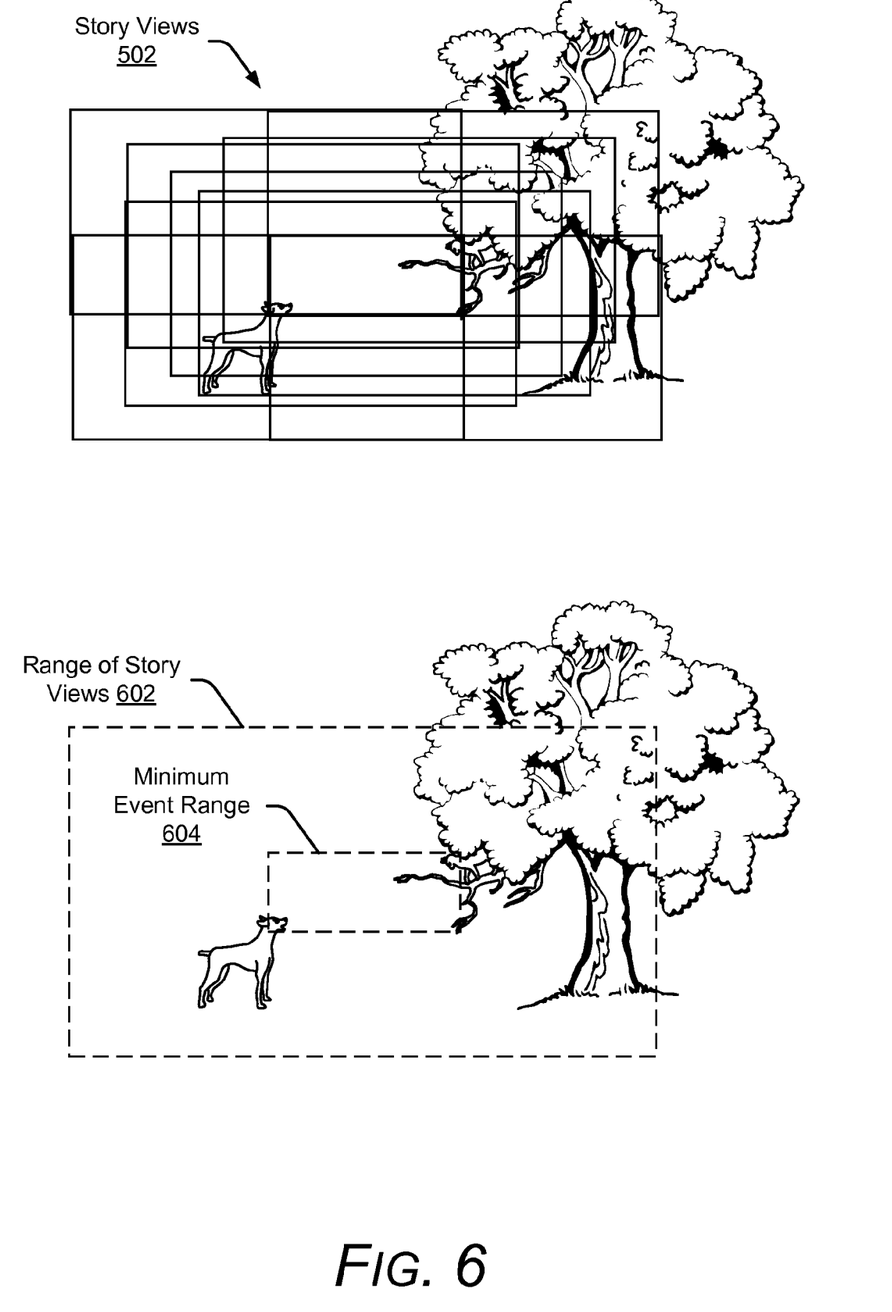
FIG. 6 illustrates a range of possible views that will be considered story views and a minimum event range for story views.

Here assume that the author assigned conditions for determining whether a view is a story view or context view such that story views are those that include at least the dog's eyes and the cat's eyes but do not require both of their bodies to be within the view. FIGS. 5 and 6 illustrate, for image 402 of FIG. 4 (shown in part for brevity), the range of possible views that will be considered story views, with other views being considered context views. For visual simplicity these story views are those of a particular display oriented horizontally, though angled, vertical, and so forth could also be shown. These story views are shown at 502, each of which shows the eyes of both dog 412 and cat 414.

FIG. 6 illustrates these story views 502 overlapping sufficient to show a range of story views 602. Thus, views within this range of story views 602 are considered story views. As noted, the author assigned the event of the dog barking at the cat to include the dog's and cat's eyes, which is shown as minimum event range 604. Thus, views having this minimum event range 604 are considered story views.

Various other manners can be used to assign or determined which views of visual experience 106 are story views 214 and which are context views 216, however. Examples include a threshold portion (e.g., 80%) of an ideal story view, a point on an image of the visual experience being within the view (e.g., all of the cat or dog but not both), a set of points or subset of the set (e.g., 4 of 5 points assigned to image 402) within the view, and so forth.

Methods

The following discussion describes techniques of visual storytelling on a mobile media-consumption device. These techniques can be implemented utilizing the previously described environment, such as display 104, view-selection mechanism 206, and/or story telling module 210 of FIGS. 1 and 2. These techniques include example methods illustrated in FIGS. 7 and 9, which are shown as operations performed by one or more entities. The orders in which operations of these methods are shown and/or described are not intended to be construed as a limitation, and any number or combination of the described method operations can be combined in any order to implement a method, or an alternate method, including any of those illustrated by FIGS. 7 and 9.

Figure 7:
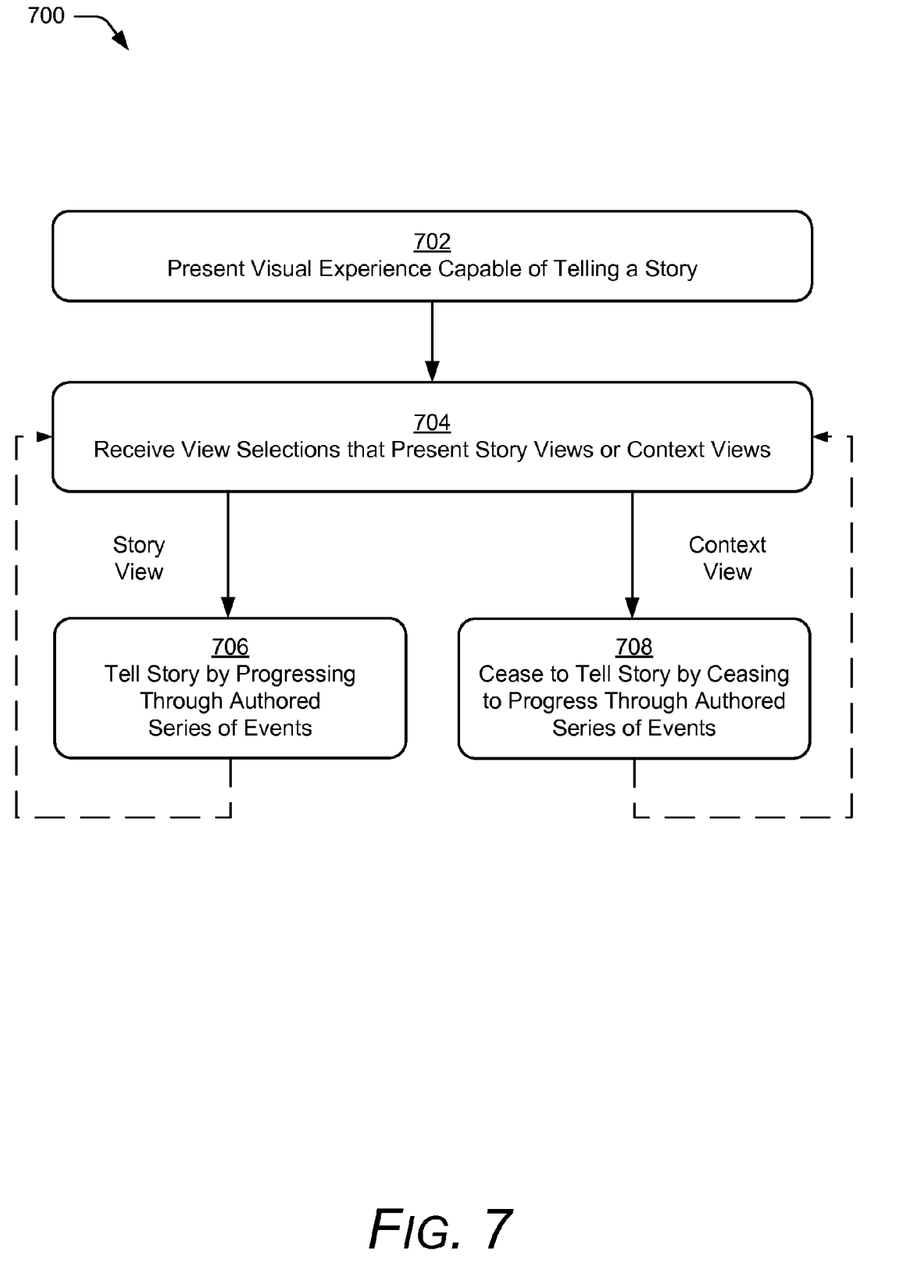
FIG. 7 illustrates example methods for visual storytelling on a mobile device.

FIG. 7 illustrates example methods 700 for visual storytelling on a mobile device.

At 702, a visual experience capable of telling a story is presented. As noted in part above, the story is an authored series of events and the visual experience includes story views and context views. The story views present at least a portion of an event of the authored series of events. The context views present visual context of the visual experience.

At 704, view selections from a mobile media-consumption device on which the visual experience is presented are received. These view selections can alter or maintain a view into the visual experience from a prior view to a current view. Altering or maintaining the view can be effective to switch, in some cases, from a story view to a context view and vice-versa. Note that view selections, even if maintaining an orientation for the device, may still result in a change between a story view and a context view, as events of the story may move within the visual experience.

When the view selections result in story views, the techniques proceed along a Story View path to operation 706, where the story is told by progressing through the authored series of events. When the view selections result in context views, the techniques proceed along the Context View path to operation 708, where the story ceases to be told by ceasing to progress through the authored series of events. Methods 700 may repeat this operation, as shown at dashed lines from operation 706 to 704 and operation 708 to 704, as view selections may alternate from story view to context view and vice-versa until the story is fully told.

At 708, storytelling module 210 may cease to progress through the authored series of events by pausing an event of a last-presented story view. Alternately or additionally, storytelling module 210 may cease progress through the authored series of events by repeating the event, a set of events of which the event is a part, or a portion of the event. Examples of this repetition are illustrated in FIG. 3 with a looped event portion 312, looped event 314, and looped set of events 316 (making up all of scene 308).

For example, storytelling module 210 may repeat the last-presented event, such as through repeating a seamless portion of an event, like repeating a loop of a half-second clip of the dog staring at the cat. This is illustrated in FIG. 3 with a portion of event looped 312. Then, when the user transitions from a context view back to the story view with the dog and cat, the story will progress in a visually seamless way. When the user left the dog and cat, the dog was staring at the cat and the cat was arching her back—the same is what the user sees when the user returns to the story.

Figure 8:
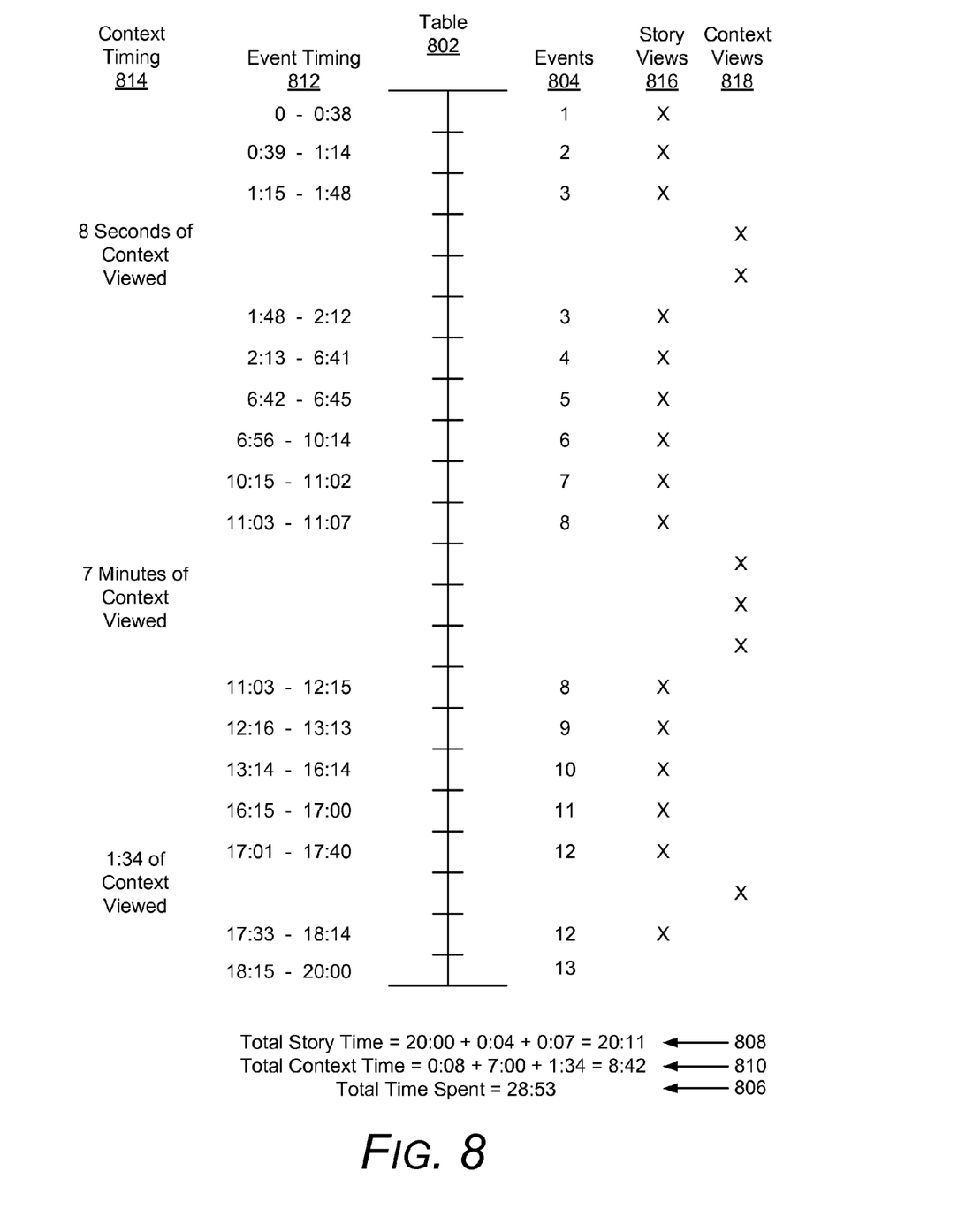
FIG. 8 illustrates a table showing a story's progression through events of the story and a total time spent, including a total time viewing the story and viewing context.

Consider the following example of methods 700, illustrated in FIG. 8. Assume that storytelling module 210 receives view selections effective to orient a display of tablet computing device 102-2 of FIG. 2 to select to alter views on the display. Assume also that, for the story about the dog and cat, the view selection selects to view context three times over the progression of the story.

FIG. 8 illustrates a table 802 showing a story's progression through events 804 of the story and total time spent 806, which includes total time viewing story 808 and context 810. FIG. 8 shows time spent viewing each event 804 of the story (event timing 812) as well as time spent viewing context (context timing 814). FIG. 8 also shows views determined to be story views 816 and context views 818. Note that each event 804 may have a different duration and that a particular user's time spent viewing the story and context depends on the user's selections.

As shown by table 802, the user spent 8:42 viewing context and 20:11 viewing the story (which can take as little as 20 minutes), for a total time spent 806 of 28:53. The additional 11 seconds to complete the story is for those events or event portions looped or otherwise repeated, with four seconds repeated from 11:03 to 11:07 and seven seconds looped with event 12 (a portion of event 12 from 17:33 to 17:40 to complete event 12 at 18:14). Not only may each user's time spent to view a story be different, but each user's view of story may also vary, based on each person likely selecting different views, even of the story itself.

In this example, the views experienced by the user include images presenting the story and images presenting the context, with the actual images seen through the user's display depending solely on the user's view selections. This can be represented mathematically as:

$$E(t)=F(Si(Ti),v(t))$$

$E(t)$ is the experienced views as a function (F) of time (t), where Si is the multiple authored events, Ti is the view changes over time, and v(t) contextual views over time.

While methods 700, and table 802 illustrated in FIG. 8, refer to views of context as pauses in the progression of the story, the techniques may present subordinate stories in response selection to view context, as described in part below.

Figure 9:
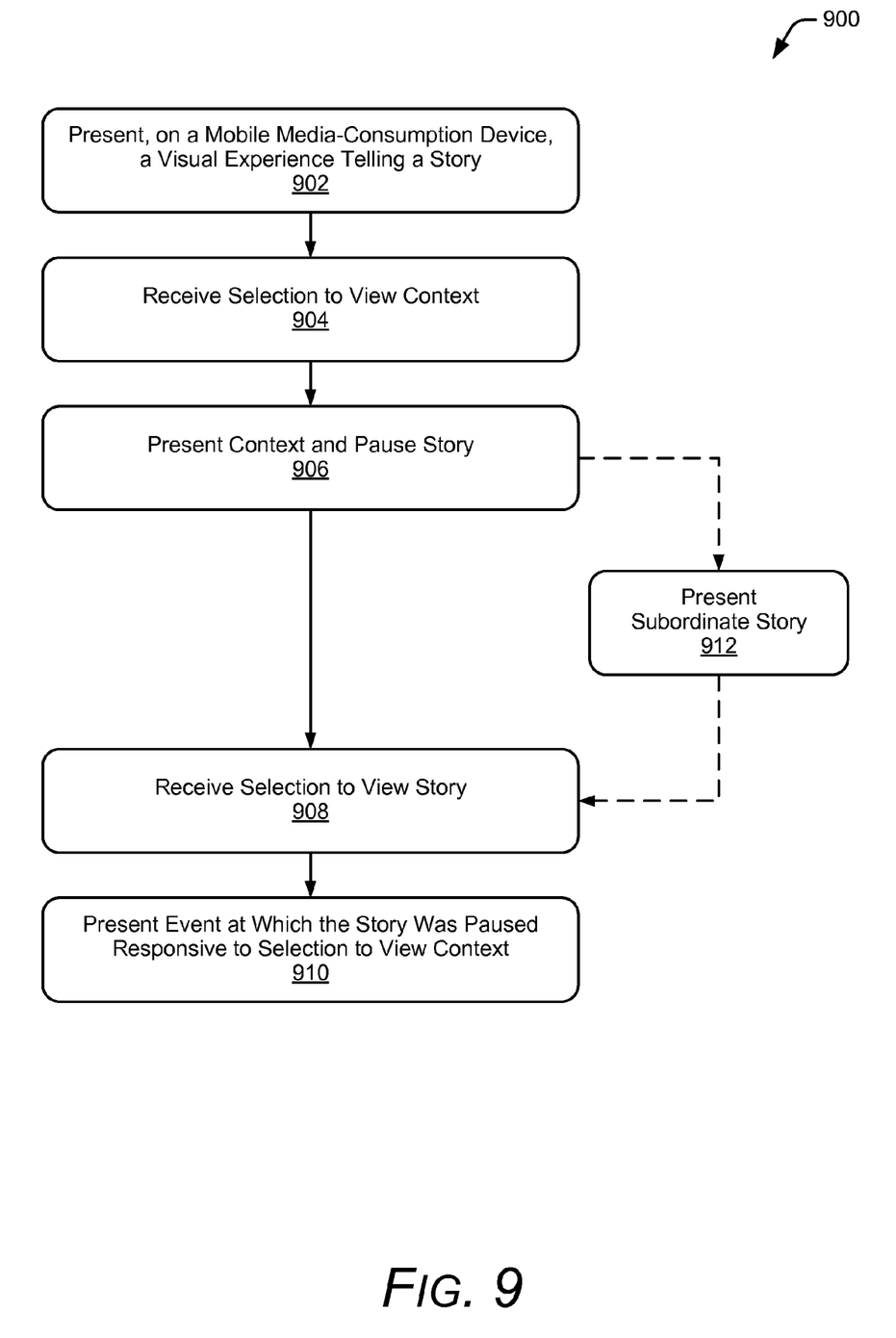
FIG. 9 illustrates example methods for visual storytelling on a mobile device, including providing subordinate stories as context.

FIG. 9 illustrates example methods 900 for visual storytelling on a mobile device, including providing subordinate stories as context.

At 902, a story is told through a visual experience presented on a mobile media-consumption device. As noted above, the context can be for the story or be part of visual experience 106 with little or no relation to the story.

At 904, a selection to view context is received. Storytelling module 210 may determine that this selection is to view context, such as by determining that the view selected no longer presents the story. In some cases, context includes a subordinate story, which is an authored series of subordinate events similar to the story for the visual experience, but not required for the story to progress.

Figure 10:
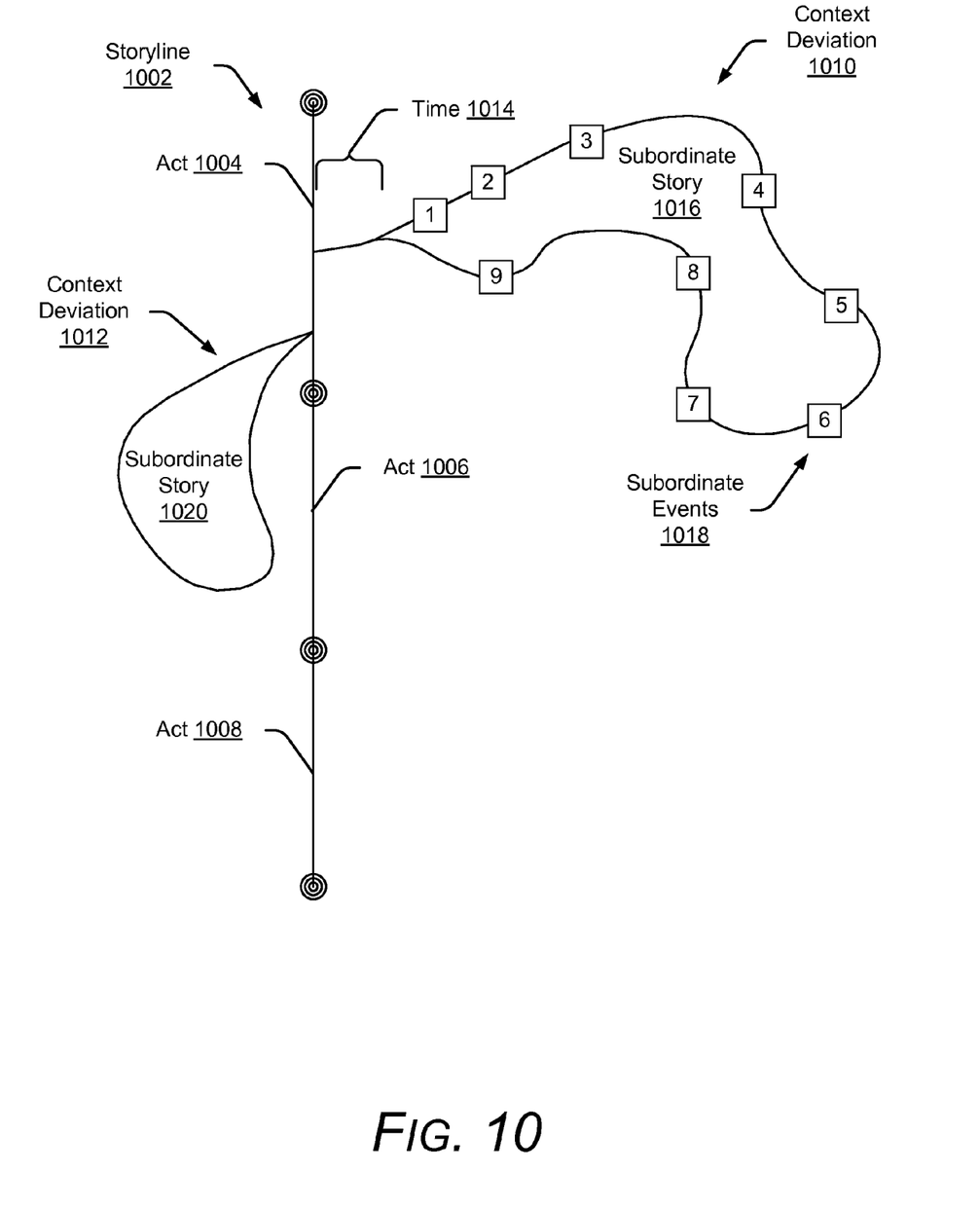
FIG. 10 illustrates a storyline, deviations into context from the storyline, and subordinate stories in accordance with one or more embodiments.

Consider again the dog-chases-cat story provided above. In that example, assume that a user selects to move from viewing the dog and cat to view a bird flying in the sky, which is neither related to nor provides context about the dog and the cat. This is illustrated in FIG. 10, which shows a storyline 1002 having three acts 1004, 1006, and 1008 of various numbers of events (not shown). Two deviations into context from storyline 1002 are shown, context deviations 1010 and 1012. Context deviation 1010 includes an amount of time 1014 viewing context but not time spent viewing subordinate story 1016 (e.g., moving a view from the story to a subordinate story and back). Subordinate story 1016's curving line illustrates an amount of time spent, which includes nine subordinate events 1018.

Context deviation 1012 includes subordinate story 1020 without time spent to move to and from the subordinate story and includes two events (not shown). Subordinate stories can include unrelated or related stories, such as showing mouse 410 jump onto flower 409 (both of FIG. 4), swinging back and forth, and jumping off again. This is a short subordinate story having few events, but can be a fun for users. Some subordinate stories provide additional detail related to, but not essential to, the main story, somewhat akin to a footnote in a non-fiction novel.

For example, a user may select to view only the cat and, in so doing, storytelling module 210 provides a subordinate story showing the cat sit on the branch, scratch her ears, lick her paws, and tauntingly ignore the dog. While subordinate story 1016 provides character development and perhaps some understanding of why the dog is chasing the cat, the author can establish that this character development is not an event of the story, and thus is not needed for the story to progress.

At 906, the context is presented and the story is paused, both responsive to the selection to view context. In some cases presenting the context for the story is performed during presentation of the event, such with a looping of the event. Thus, if a portion of the event is shown, but is insufficient to cause the story to progress, the portion of the event may repeat or loop, but on returning the event is fully told. If a context view includes the left half of the dog, for example, a user may see the dog's body shake from barking and hear the bark. Further, when presenting context, audio for the story can continue to be heard, such as in a loop of a current event. In such cases, volume for the event's sounds may be reduced, such as based on a visual distance from the context view to the event.

Returning to the flying-bird example above, assume that storytelling module 210 receives a selection to view the flying bird from orientation sensors of tablet computing device 102-2 of FIG. 2. On receiving this selection moving to view the flying bird, storytelling module 210 determines when the selected view no longer shows a story view 214 having the dog's and cat's eyes (e.g., a view outside minimum event range 604). Storytelling module 210 then shows the bird flying and, if the user selects to follow the bird, the bird landing on an upper branch of the tree.

At 908, a selection to view the story is received. Storytelling module 210 may determine that this selection is to view the story, such as by determining that the view selected presents minimum elements of a story view. For example, the selection may be of a view that includes a minimum event range in which elements of characters of the story are located. In the context of the present example, assume that storytelling module 210 receives selection to view one of story views 502, all of which include minimum event range 604, which indicates selection of at least one valid story view.

At 910, an event at which the story was paused responsive to the selection to view context is presented. As described above, the event, or a portion thereof, may begin looping at or near a time of being paused. In such cases, the event of the story is presented by re-entering a current loop of the event and then progressing to a subsequent event. By so doing, the story progresses, though one or more events or portions of events may be repeated, as noted above.

In some cases, storytelling module 210 may indicate to the user whether or not a current view is or is not progressing the story (or subordinate story) by presenting a visual indicator in the view. Examples include items that are noticeable but unobtrusive, such as a moth fly near the dog and cat, items of clothing of a same or similar color, even if on different characters, and so forth. More-obvious indicator can also be used, such as reduced resolution when in contextual views, zooming out or zooming in response to contextual views, a flashing light, and so forth. When the last event of the story is presented, storytelling module 210 may end the visual experience.

Example Device

Figure 11:
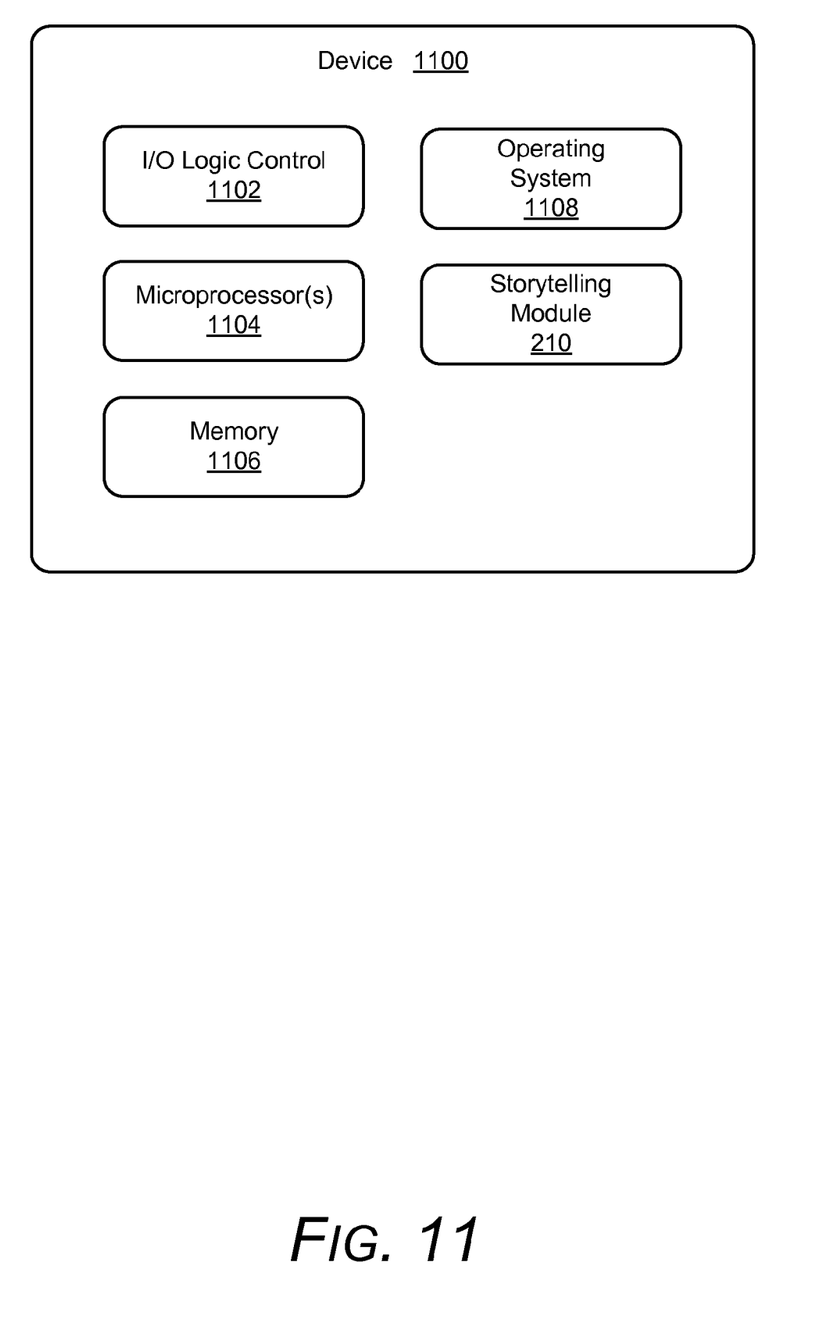
FIG. 11 illustrates a device having various components capable of implementing techniques of visual storytelling on a mobile device.

FIG. 11 illustrates various components of an example device 1100 including storytelling module 210 including or having access to other modules, these components implemented in hardware, firmware, and/or software and as described with reference to any of the previous FIGS. 1-10.

Example device 1100 can be implemented in a fixed or mobile device being one or a combination of a media device, computing device (e.g., mobile device 102 of FIG. 1), video processing and/or rendering device, appliance device (e.g., a closed-and-sealed computing resource, such as some digital video recorders or global-positioning-satellite devices), gaming device, electronic device, vehicle, and/or workstation, so long as each is associated with a mobile display.

Example device 1100 can be integrated with electronic circuitry, a microprocessor, memory, input-output (I/O) logic control, communication interfaces and components, other hardware, firmware, and/or software needed to run an entire device. Example device 1100 can also include an integrated data bus (not shown) that couples the various components of the computing device for data communication between the components.

Example device 1100 includes various components such as an input-output (I/O) logic control 1102 (e.g., to include electronic circuitry) and microprocessor(s) 1104 (e.g., microcontroller or digital signal processor). Example device 1100 also includes a memory 1106, which can be any type of random access memory (RAM), a low-latency nonvolatile memory (e.g., flash memory), read only memory (ROM), and/or other suitable electronic data storage.

Example device 1100 can also include various firmware and/or software, such as an operating system 1108, which can be computer-executable instructions maintained by memory 1106 and executed by microprocessor 1104. Example device 1100 can also include other various communication interfaces and components, wireless LAN (WLAN) or wireless PAN (WPAN) components, other hardware, firmware, and/or software.

Other examples capabilities and functions of these components are described with reference to elements shown in FIGS. 1 and 2, along with illustrations of FIGS. 3-10. These components, either independently or in combination with modules or entities described herein, can be implemented as computer-executable instructions maintained by memory 1106 and executed by microprocessor 1104 to implement various embodiments and/or features described herein. These components may also be provided integral with other components of device 1100, such as integrated with storytelling module 210. Alternatively or additionally, any or all of these components can be implemented as hardware, firmware, fixed logic circuitry, or any combination thereof that is implemented in connection with the I/O logic control 1102 and/or other signal processing and control circuits of example device 1100. Furthermore, some of these components may act separate from device 1100, such as a remote (e.g., cloud-based) component performing services for storytelling module 210.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A mobile media consumption device comprising:
   a display device;
   one or more hardware processors; and
   one or more computer-readable storage devices storing processor-executable instructions that are executable by the one or more hardware processors to implement a storytelling module configured to:
   present a visual experience capable of telling a story, the story including an authored series of events and visual context, the authored series of events representing a storyline of the story, the visual context providing context for the storyline, the visual experience including story views and context views, the story views each having at least a portion of a respective event of the authored series of events, the context views each including at least a portion of the visual context for the storyline;
   display a portion of the visual experience on the display device based on a display view that is initially mapped to the portion of the visual experience;
   cause the display view to move across the visual experience and map to different portions of the visual experience based on a user input;
   determine whether the display view corresponds to a story view or a context view based on an amount of the respective event visually included within the display view; and
   perform one or more operations associated with a progression through the authored series of events based on the determination.

2. The mobile media consumption device as recited in claim 1, wherein the context views include no portion of the respective event of the authored series of events.

3. The mobile media consumption device as recited in claim 1, wherein the context views include an insufficient portion of the respective event of the authored series of events, the insufficient portion including less than the portion of the respective event of the authored series of events of the story views.

4. The mobile media consumption device as recited in claim 1, wherein at least a portion of the respective event of the authored series of events is previously determined to display one or more main characters of the story.

5. The mobile media consumption device as recited in claim 1, wherein the authored series of events are human-authored and fixed in both order and number.

6. The mobile media consumption device as recited in claim 1, wherein:
the storytelling module is further configured to cease to progress through the authored series of events based on a determination that the display view corresponds to the context view;
the progress is ceased by repeating the respective event, a set of events of which the respective event is a part, or a portion of the respective event in a loop; and
the loop enables a transition from a context view to a story view to seamlessly present the story.

7. The mobile media consumption device as recited in claim 1, wherein the visual experience is a live-action or animated motion picture, and wherein the motion picture includes annotations identifying the display view as being one of the story view or the context view.

8. The mobile media consumption device as recited in claim 1, wherein the storyline module is further configured to cease progression through the authored series of events based on the respective event of the authored series of events moving out of the portion of the visual experience mapped to the display view.

9. The mobile media consumption device as recited in claim 1, wherein the causing of the display view to move across the visual experience is based on a movement of the display device through at least one of the following: tilts, turns, moves up, moves left, moves right, or moves down.

10. The mobile media consumption device as recited in claim 1, wherein the user input is received through at least one of: a button of the mobile media consumption device, a capacitive sensor of the mobile media consumption device, a touch screen of the mobile media consumption device, a camera of the mobile media consumption device, or an orientation sensor of the mobile media consumption device.

11. A method comprising:
presenting a visual experience capable of telling a story via a display device associated with a mobile device, the story including an authored series of events and visual context, the authored series of events representing a storyline of the story, the visual context providing context for the storyline, the visual experience including story views each having at least a portion of a respective event of the authored series of events and context views each including at least a portion of the visual context for the storyline;
determining a first display view based on a first orientation of the display device;
displaying, via the display device, a first portion of the visual experience based on the first display view;
receiving a first selection of a first display view representing a first view into the visual experience for display via the display of the mobile device;
determining that the first display view corresponds to a context view based on an amount of a respective story view visually contained within the first view;
responsive to the determining that the first display view corresponds to the context view:
presenting the visual context via the display device; and
pausing progression through the authored series of events at a respective event;
determining a second display view based on a second orientation of the display device that is different than the first orientation;
displaying, via the display device, a second portion of the visual experience based on the second display view, the second portion different than the first portion;
determining that the second display view corresponds to a story view based on an amount of the respective event visually contained within the second display view; and
responsive to the second display view corresponding to the story view, presenting the respective event at which the progression through the authored series of events was paused.

12. The method as recited in claim 11, wherein the visual context includes a subordinate story including an authored series of subordinate events.

13. The method as recited in claim 11, wherein the first orientation and the second orientation are received through orientation sensors of the mobile device that detect a motion that modifies the display of the mobile device through at least one of the following: tilts, turns, moves up, moves left, moves right, or moves down.

14. The method as recited in claim 11, wherein:
the visual context for the storyline is presented during presentation of the respective event at which the progression through the authored series of events was paused based on the first display view; and
the presenting of the respective event at which the storyline was paused includes repeating the respective event from a starting point of the respective event.

15. The method as recited in claim 11, wherein:
the visual experience includes a set of images including a first subset of images presenting the storyline and a second subset of images presenting the visual context for the storyline; and
a display of each said subset of images is solely dependent on user selections of display views.

16. The method as recited in claim 11, wherein the mobile device includes a device configured as glasses, a phone, a tablet computer, a laptop, or an e-book reader.

17. The method as recited in claim 11, further comprising altering audio responsive to presenting the visual context of the first display view, wherein the altering of the audio reduces a volume for sounds associated with the authored series of events of the storyline, and wherein the audio volume is based on a visual distance from the first display view to the events of the storyline.

18. The method as recited in claim 11, further comprising presenting a visual indicator indicating when the visual experience is or is not progressing through the authored series of events.

19. The method as recited in claim 11, wherein the determining that the first display view corresponds to the context view is based on the amount of the respective story view visually contained within the first display view being less than a threshold.

20. The method as recited in claim 11, wherein the determining that the second display view corresponds to the story view is based on the amount of the respective event visually contained within the second display view having a minimum event range.

* * * * *

UNITED STATES PATENT AND TRADEMARK OFFICE
CERTIFICATE OF CORRECTION

PATENT NO. : 9,766,786 B2  Page 1 of 1
APPLICATION NO. : 14/333387
DATED : September 19, 2017
INVENTOR(S) : Elmieh et al.

It is certified that error appears in the above-identified patent and that said Letters Patent is hereby corrected as shown below:

In the Claims

Column 11, delete Lines 50, 51, 52
Column 11, Line 55 after "first" before "view;" insert --display--

Signed and Sealed this
Fifth Day of December, 2017

Joseph Matal
*Performing the Functions and Duties of the
Under Secretary of Commerce for Intellectual Property and
Director of the United States Patent and Trademark Office*